United States Patent
Chaumel et al.

(10) Patent No.: US 9,114,870 B2
(45) Date of Patent: Aug. 25, 2015

(54) CABIN WINDOW WITH PLANNED DEFORMATION, METHOD OF MANUFACTURING SUCH A WINDOW AND AIRCRAFT COMPRISING SUCH A WINDOW

(71) Applicant: Airbus Operations (SAS), Toulouse (FR)

(72) Inventors: Pascal Chaumel, Plaisance du Touch (FR); Patrick Lieven, Fronton (FR); Serge Cassagnes, Pompignan (FR)

(73) Assignee: Airbus Operations (S.A.S.), Toulouse (FR)

( * ) Notice: Subject to any disclaimer, the term of this patent is extended or adjusted under 35 U.S.C. 154(b) by 272 days.

(21) Appl. No.: 13/896,754

(22) Filed: May 17, 2013

(65) Prior Publication Data
US 2013/0320143 A1   Dec. 5, 2013

Related U.S. Application Data

(63) Continuation of application No. PCT/FR2011/052715, filed on Nov. 21, 2011.

(30) Foreign Application Priority Data

Nov. 19, 2010   (FR) ..................................... 10 59526

(51) Int. Cl.
*B64C 1/14*   (2006.01)
(52) U.S. Cl.
CPC .................................. *B64C 1/1484* (2013.01)
(58) Field of Classification Search
None
See application file for complete search history.

(56) References Cited

U.S. PATENT DOCUMENTS

| 2,602,970 | A  | * | 7/1952  | Gouge         | 52/1      |
|-----------|----|---|---------|---------------|-----------|
| 5,988,566 | A  | * | 11/1999 | Meyer         | 244/129.3 |
| 6,168,112 | B1 | * | 1/2001  | Mueller et al.| 244/129.3 |
| 7,118,070 | B2 | * | 10/2006 | Abrams et al. | 244/129.3 |
| 7,281,686 | B2 | * | 10/2007 | Wood          | 244/129.3 |
| 7,552,896 | B2 | * | 6/2009  | Coak          | 244/129.3 |
| 7,807,003 | B2 | * | 10/2010 | Schuler       | 156/109   |
| 7,968,170 | B2 | * | 6/2011  | Albers et al. | 428/138   |

(Continued)

FOREIGN PATENT DOCUMENTS

| FR | 873191  | 7/1942 |
| FR | 1008481 | 5/1952 |

(Continued)

OTHER PUBLICATIONS

International Search Report for PCT/FR2011/052715 dated Apr. 12, 2012.

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

The present invention relates to an aircraft window, of the type including a holding frame for securing the window to the fuselage of an aircraft and at least one pane mounted in the holding frame by a sealing system, the at least one pane having an inner surface and an outer surface, characterized in that: the pane includes, in a first state called the rest state, at least one concavity in its outer surface when there is no pressure difference between the outer surface and the inner surface of the pane, and the at least one concavity of the pane is at least partially eradicated in a second state in which there is a pressure difference between the outer surface and the inner surface of the pane.

18 Claims, 3 Drawing Sheets

(56) References Cited

U.S. PATENT DOCUMENTS

| | | | |
|---|---|---|---|
| 8,114,232 B2 * | 2/2012 | Lisec | 156/64 |
| 8,511,610 B2 * | 8/2013 | Depeige | 244/129.5 |
| 8,567,720 B2 * | 10/2013 | Gallant et al. | 244/119 |
| 8,800,926 B2 * | 8/2014 | Kirchoff et al. | 244/129.3 |
| 2006/0123718 A1 * | 6/2006 | Paspirgilis | 52/204.1 |
| 2008/0078494 A1 * | 4/2008 | Nordman | 156/168 |
| 2012/0097794 A1 * | 4/2012 | Fort et al. | 244/129.4 |
| 2012/0325344 A1 * | 12/2012 | Chaumel et al. | 137/557 |
| 2013/0168495 A1 * | 7/2013 | Mueller et al. | 244/129.3 |
| 2015/0064389 A1 * | 3/2015 | Zahlen et al. | 428/76 |

FOREIGN PATENT DOCUMENTS

| | | |
|---|---|---|
| WO | WO 00/20275 | 4/2000 |
| WO | WO 2012/066264 | 5/2012 |

* cited by examiner

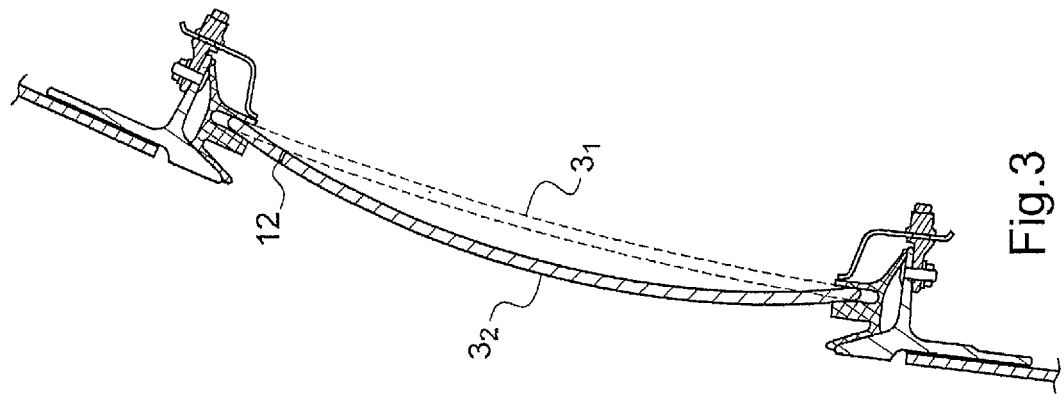
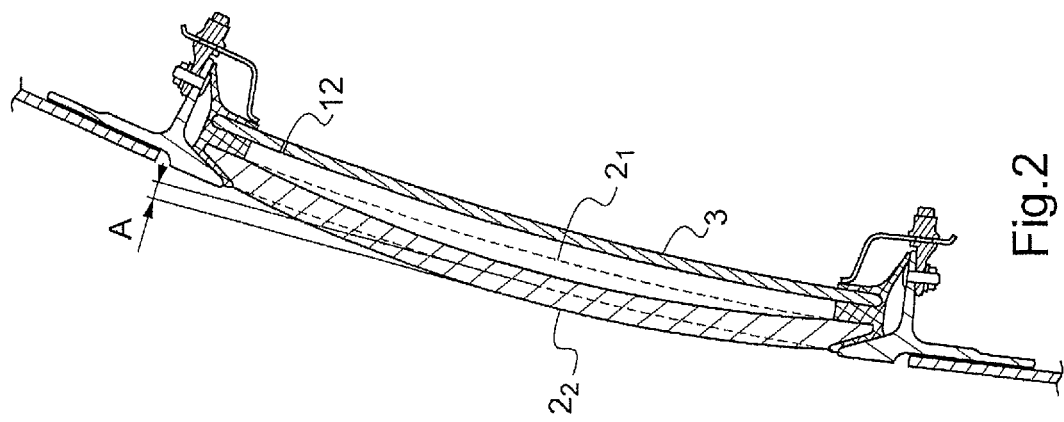
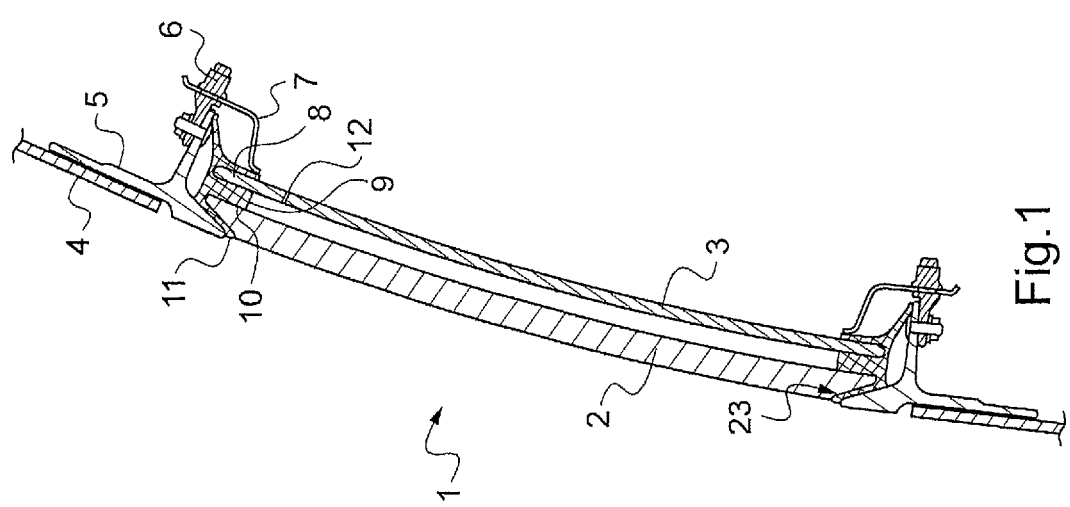

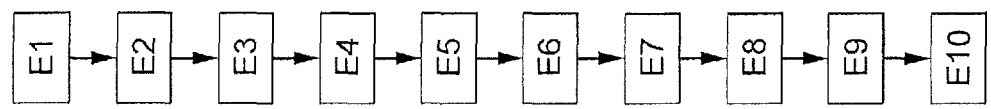
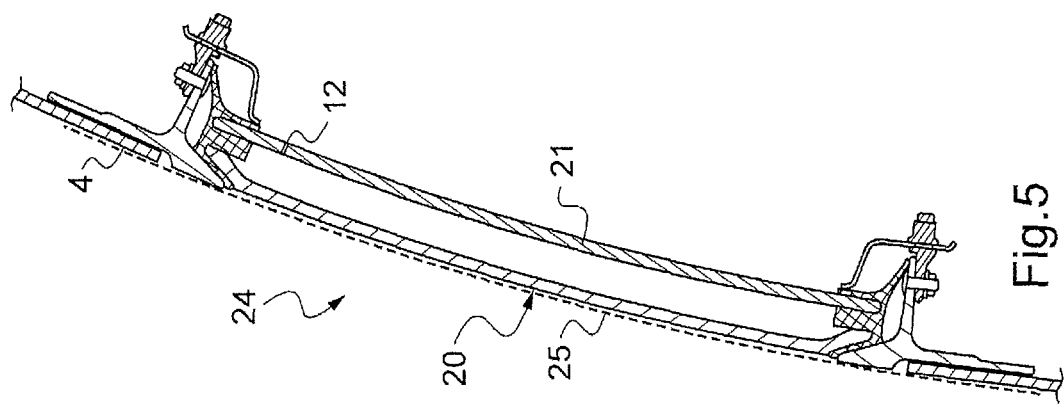
Fig.6
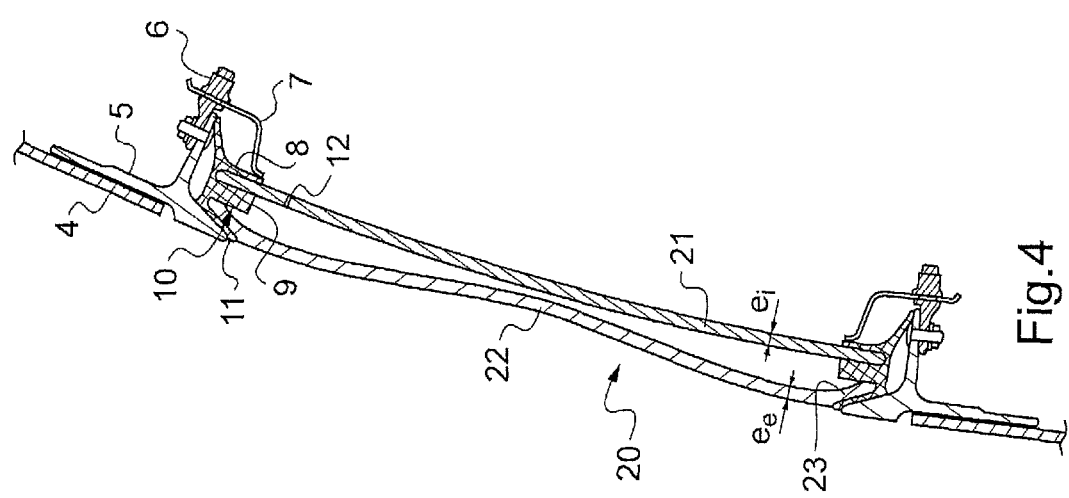
Fig.5
Fig.4

CABIN WINDOW WITH PLANNED DEFORMATION, METHOD OF MANUFACTURING SUCH A WINDOW AND AIRCRAFT COMPRISING SUCH A WINDOW

CROSS-REFERENCE TO RELATED APPLICATIONS

This application is a continuation of PCT Application Serial No. PCT/FR2011/052715, filed Nov. 21, 2011, which claims priority to French Application Serial No. 1059526, filed Nov. 19, 2010, the entire contents of which are both incorporated by reference herein.

TECHNICAL FIELD

The present invention relates to an aircraft window and a method of manufacturing such a window. It also relates to an aircraft equipped with such a window.

BACKGROUND

Aircraft windows are known in the state of the art that are constituted by an inner pane and an outer pane, both mounted by means of a sealing ring on a window frame intended to be mounted flush on the fuselage of the aircraft.

Among the functions of the window there can be mentioned:

allowing passengers to look out, in particular during take-off;

maintaining the pressure inside the cabin during the flight, even at high altitude.

In the state of the art, the outer pane is subjected to a significant pressure difference in flight between the relatively low outer pressure and the inner pressure, which is substantially that of the aircraft cabin.

In order to avoid stressing the inner pane, the latter is pierced so as to equalize the pressure between the cabin itself and the gap or volume constituted between the inner and outer panes of the window.

In a known manner, the outer pane is designed so as to remain flush with the outer surface of the fuselage when the aircraft is situated at ground level and, as a result, produce a minimal adverse effect from an aerodynamic point of view.

Owing to the pressure difference between the ground and in particular the cruising altitude of the aircraft, the outer pane tends to deform toward the outside of the fuselage. In order to ensure that the additional drag effect does not exceed a certain limit, care must be taken that the maximum extra thickness introduced by the outer pane with respect to the natural surface of the fuselage also does not exceed a certain limit. Under given flight conditions, the thickness of the pane must therefore be increased, in particular by using a greater quantity of material so as to ensure that its deformation toward the outside of the fuselage does not exceed an acceptable tolerance, in particular vis-à-vis the aerodynamic drag effect.

Consequently, the outer pane must be thicker than the inner pane. In an embodiment of the state of the art, the thickness of the outer pane is 11 mm and that of the inner pane is 5.25 mm. In this embodiment, the weight of all of the outer panes of the aircraft together is 200 kg.

Moreover, the operating cost of an aircraft is a direct function of the mass of the aircraft, since the greater the mass of the aircraft, the more fuel is needed. Consequently, reducing the operating cost in flight requires a reduction in the mass of the aircraft. It will be noted that the drag effect also increases the resistance in flight and therefore the quantity of fuel required.

The abovementioned extra thickness of the outer pane of the aircraft windows specifically increases the mass of the aeroplane.

SUMMARY

A subject of the invention is an aircraft window, of the type comprising a holding frame for securing the window to the fuselage of an aircraft and at least one pane mounted in the holding frame by means of a sealing system, said at least one pane having an inner surface and an outer surface, characterized in that:

the pane comprises, in a first state called the rest state, at least one concavity in its outer surface when there is no pressure difference between the outer surface and the inner surface of the pane, said at least one concavity of the pane is at least partially eradicated in a second state in which there is a pressure difference between the outer surface and the inner surface of the pane.

The advantage is obtaining a thinner pane than the panes used hitherto and therefore reducing the on-board mass.

The shape of the pane has in fact been modified to take account of a pressure difference that will be established at altitude between the outer surface and the inner surface of the pane and to which the pane will be subjected.

In the first state said at least one concavity tends to distance the outer surface of the pane from the virtual extension of the curvature of the fuselage at the window.

In other words, said at least one concavity tends to bring the outer surface (and also the inner surface) of the pane closer to the inside of the aircraft.

It will be noted that said at least one concavity is designed so that it does not obstruct visibility through the window. Moreover, the thickness of the pane can be reduced owing to the concavity, making it possible to retain good visibility through the window.

Thus, when the aircraft takes off, said at least one concavity is at least partially eradicated.

When leaving the first rest state the aircraft enters an intermediate state and the shape of the concavity varies progressively: the concavity becomes progressively less pronounced (the radius of curvature increases) as the aircraft climbs in altitude and the aircraft cabin pressurization is put in place, thus establishing the aforementioned pressure difference.

According to a possible feature, said at least one pane is produced from a transparent material, for example, cast.

This material can be moulded and makes it possible to obtain high-precision components that have complex, varied shapes by moulding alone.

Such a material retains very good mechanical characteristics after moulding. The thickness of the pane produced in this material can thus be reduced, which achieves a reduction in the on-board mass.

According to a possible feature, when the pressure difference between the outer surface and the inner surface of the pane reaches a predetermined value, said at least one concavity is completely eradicated.

The concavity is in fact completely eradicated when the aircraft reaches a stabilized state defined by a maximum pressure difference between the aircraft cabin and the outside of the aircraft at a given cruising altitude (the pressure is lower than the on-ground pressure but becomes constant during this phase of steady flight).

The outer surface of the pane then adopts the curvature of the fuselage and is thus arranged in the virtual extension thereof so as to be mounted in flush position with respect to the fuselage.

According to a possible feature, in flight the outer surface of the pane comprising said at least one concavity has an optimum aerodynamic shape established for a given aircraft.

According to a possible feature, said at least one concavity is opposite to the concavity of the fuselage of the aircraft, which is oriented toward the inside of the aircraft.

According to a feature, said at least one concavity is defined in a transverse cross-section of the fuselage.

According to a possible feature, the pane comprising said at least one concavity comprises at least one edge having a shape that makes it possible to insert said pane into a standard holding frame. Thus, the window can be inserted into all existing frames or assemblies.

According to a possible feature, the window comprises at least two panes, namely an inner pane and an outer pane comprising said at least one concavity, each pane having a inner surface and an outer surface, the inner surface of the outer pane facing the outer surface of the inner pane.

According to another possible feature, in the first state said at least one concavity tends to move the outer surface of the pane comprising said at least one concavity closer to the inside of the aircraft when there is no pressure difference between the outer surface and the inner surface of said pane, the at least partial eradication of said at least one concavity of said pane taking place in the second state, in which there is a pressure difference between the outer surface and said inner surface of said pane.

All of the advantages disclosed above relating to the pane of the window comprising said at least one concavity are applicable to the outer pane of the window when the latter comprises an inner pane and an outer pane provided with at least one concavity.

The pressure difference between the outer surface of the outer pane and the inner surface of the inner pane corresponds to the pressure difference between the outer and inner surfaces of the outer pane by virtue of the presence, in the inner pane, of pressure-equalizing holes.

According to a possible feature, the pane comprising said at least one concavity is an assembly of several plies secured together by means of at least one intermediate film arranged between two consecutive plies.

The pane constitutes a sort of sandwich or laminated structure.

The set or assembly of the structural plies held permanently together provides greater rigidity to the pane thus obtained than with a pane of the prior art.

It will be noted that the thickness of the laminated or sandwich assembly can be reduced very significantly with respect to the total thickness of the two inner and outer panes of a window of the prior art.

This reduction in thickness results in a very significant reduction in the on-board mass.

The plies of the laminated assembly are, for example, secured together by bonding.

One or more intermediate films are for example arranged between two consecutive plies in order to ensure bonding of the plies with each other, for example after heating the assembly in an autoclave.

By way of example, the assembly comprises two plies and an intermediate adhesive film between the two superimposed plies.

According to another feature, the sealing system for mounting said at least one pane in the holding frame is made of polysulphide mastic.

This sealing system or sealing ring system provides sealing both when on the ground (rain, dust, etc.) and in flight, taking account of the pressurization of the aircraft in flight.

Polysulphide mastic is particularly advantageous inasmuch as it deforms much less during use (in particular in flight) than the materials of the sealing rings of the prior art, while providing sealing very satisfactorily on the ground and in flight.

According to other possible features, singly or in combination with one or more of the features disclosed above:
  the thickness of the pane comprising said at least one concavity is reduced with respect to the thickness of a conventional window pane (state of the art);
  the pane comprising said at least one concavity is produced by moulding a transparent material and its thickness is reduced with respect to that of a conventional window pane (state of the art).

It is for example possible to use acrylic or polycarbonate as cast transparent material. It would alternatively be possible to use drawn acrylic, using hot press moulding or hot form pressing.

The invention also relates to an aircraft comprising a fuselage and at least one window as briefly disclosed above, secured to said fuselage.

Generally, such an aircraft comprises a plurality of windows of this type that do not introduce additional mass with respect to the windows of the state of the art.

The invention also relates to a method for the manufacture of an aircraft window of this type comprising at least one pane having an inner surface and an outer surface, the method comprising a step of forming the pane in order to give the outer surface thereof at least one concavity having a given depth, said at least one concavity being intended to be maintained in the outer surface at said depth in the absence of a pressure difference between the inner and outer surfaces of the pane.

The term "forming" covers any principle of producing a complex concave shape, obtained by moulding, drawing, lamination, hot forming, creep or any other shaping principle.

An advantage of this aspect of the invention is that it makes it possible to determine, for the pane provided with said at least one concavity, an optimum aerodynamic shape in flight (in the presence of a predetermined pressure difference) starting from a shape on the ground that does not have optimal aerodynamic features, but nevertheless provides good visibility.

According to a possible feature, the step of forming the pane is adapted so that said at least one concavity given to the outer surface of the pane is at least partially eradicated as and when a pressure difference is established between the inner and outer surfaces of said pane.

According to a possible feature, the pane provided with said at least one concavity is designed so that, when a predetermined pressure difference operates between its inner and outer surfaces, the outer surface adopts an optimum aerodynamic shape for a given aircraft.

According to a possible feature, the window comprising at least two panes, namely an inner pane and an outer pane, the forming step is applied to the outer pane.

All the advantages of the method that are disclosed above relate to the step of forming the outer pane of the window when the latter comprises an inner pane and an outer pane provided with at least one concavity.

According to other possible features, singly or in combination with one or more of the aforementioned features:

the method comprises a prior step of assembling several plies and at least one intermediate film arranged between two consecutive plies for securing the set of plies assembled in this way;

the securing step is a bonding step, for example by heating the assembly in an autoclave;

the method comprises a step of injecting a material constituting a sealing system around said at least one pane for mounting the pane in a holding frame of the window;

the injected material constituting the sealing system is a polysulphide mastic.

BRIEF DESCRIPTION OF THE DRAWINGS

Other features and advantages of the present invention will be better understood in the light of the following description and the attached Figures, in which:

FIG. 1 is a cross-sectional view of a window of the state of the art mounted on part of the fuselage of an aircraft during a first state in which the aircraft is on the ground;

FIG. 2 is a view of the window during a second state, with the aircraft at altitude;

FIG. 3 shows a window of the state of the art in which the outer pane has broken;

FIG. 4 is a diagrammatic cross-sectional view of a window according to a first embodiment of the invention, in a first state of the aircraft;

FIG. 5 is a view of the window in FIG. 4, in a second state of the aircraft when it is at high altitude;

FIG. 6 shows a flow chart of a method of manufacturing an aircraft window according to the invention;

DETAILED DESCRIPTION

Figure 7:
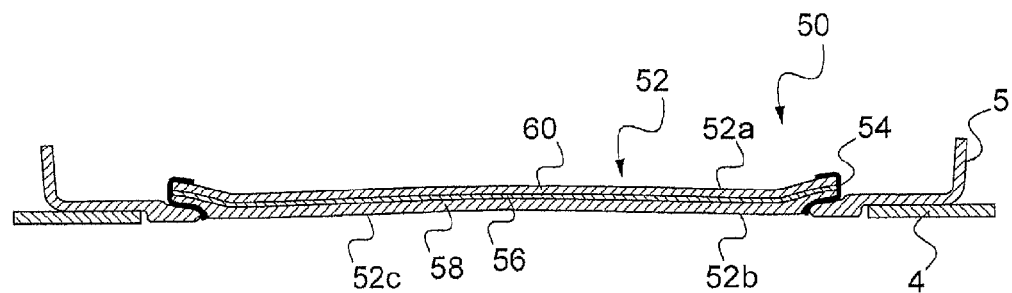
FIG. 7 is a diagrammatic cross-sectional view of a window according to a second embodiment of the invention, in a first state of the aircraft.

FIG. 1 shows a diagrammatic cross-sectional view of an aircraft window of the state of the art mounted on a fuselage 4. The window 1 comprises principally an outer pane 2 and an inner pane 3 mounted on a metal frame 5 in a sealing system or sealing ring 8-11. The sealing ring is arranged on the substantially parallel rims of the two panes. The sealing ring 8-11 is held by a resilient metal profile 7 mounted on a hinge 6 that is secured to the metal frame 5 of the window.

The window is manufactured so that, at the on-board atmospheric pressure (first state), the shape of the outer pane 2 is substantially an extension of the shape of the fuselage. The inner and outer panes then have substantially parallel surfaces, allowing passengers to look through the window at the landscape on takeoff without experiencing a distorted view.

In FIG. 2, the aircraft (airliner) has reached its cruising speed and its cruising altitude during a second state. The pressure difference between the outer atmosphere on the one hand and the controlled atmosphere inside the cabin on the other hand, produces a deformation of the outer pane, which passes from the position $2_1$ (shown in broken lines in FIG. 2 and corresponding to the position of the outer pane in FIG. 1) to a position $2_2$ in which the outer pane projects outwards with respect to the fuselage.

The outer pane 2 is designed so that under the flight conditions occurring during the second state, on the one hand the outer pane 2 in position $2_2$ goes beyond by a thickness A the ideal flush position $2_1$ shown in broken lines, and on the other hand, the thickness A does not exceed a predetermined value. The aerodynamic drag effect (during the cruising phase of the airliner thus equipped) can thus be kept within limits considered acceptable in the state of the art.

In order to ensure compliance with the limit A, it is necessary to produce an outer pane having an adequate thickness.

This thickness must be greater than the thickness of the inner pane which does not deform.

The inner pane 3 is not subjected to the pressure difference owing to the arrangement of pressure-equalizing holes such as the hole 12 in FIGS. 1 to 3.

FIG. 3 shows the situation during accidental breakage at altitude of the outer pane 2.

The inner pane then passes from position $3_1$ (shown in broken lines and corresponding to the position of the inner pane in FIG. 2) to a position $3_2$ because the outer pressure has dropped with the loss of the outer pane. The hole that previously served to equalize the pressures is sufficiently small to generate only minimum leakage without affecting the maintenance of the pressure inside the vehicle. It is well understood that the situation in which the inner pane 3 becomes the only window pane is an accidental circumstance that is very infrequent.

The vehicle for which the invention was designed is an aircraft, for example an airliner. For the purposes of analysis of the technical problem and as is apparent from the presentation of the state of the art in the previous figures, two states of the aircraft have been identified in which the windows have the following different, in particular aerodynamic, behaviours:

an on-ground state in which the aircraft is at a standstill or slow-moving, defining a first state (first so-called rest state) for which there is no pressure difference between the inside and the outside of the aircraft, and an in-flight state defining a second state of the aircraft, for which a pressure difference is established between the inside and the outside of the aircraft when the pressurization of the cabin has been activated.

Said second state can for example be when the aircraft is at its cruising altitude.

Both to reduce the mass of the outer pane and to improve the impact of the window on the aerodynamic drag, the design procedure of the window has been reversed. Instead of giving the window a flush shape in the first on-ground state and then seeking to limit its deformation in the second in-flight state as in the state of the art, the invention proposes, for a minimal thickness of the outer pane, to seek a shape of the outer pane in the on-ground state that produces, in the second in-flight state, an optimal shape from the point of view of the aerodynamic effect.

FIG. 4 shows a diagrammatic cross-sectional view of a window according to a first embodiment of the invention, mounted in an aircraft fuselage 4. In this Figure, the same elements as those in FIG. 1 bear the same reference numbers and will not be further described. The arrangement of an outer pane 20 will be noted, the thickness $e_e$ of which is substantially reduced with respect to the thickness of the equivalent outer pane 2 of the state of the art (FIGS. 1 and 2).

Moreover, the outer pane 20 has, in transverse cross-section of the fuselage, a concavity 22 in its outer surface that tends to bring the inner surface of said pane closer to the outer surface of the inner pane 21. Thus, the apex of the inner surface of the outer pane 20 is close to, or in contact with, the outer surface of the inner pane 21. The amplitude or depth of the concavity extends in the transverse cross-section of the fuselage.

It will be noted that the concavity is formed in a direction opposite to the concavity of the fuselage, the fuselage having a domed shape toward the outside of the aircraft.

This arrangement of a concavity 22 bringing the outer pane nearer to the inner pane can be given to the outer pane without introducing a significant visual distortion for passengers looking out through the window.

The concavity 22 is designed so as to be fully formed whenever the window is in the first aforementioned state (aircraft on the ground).

This concavity is also designed to disappear when the aircraft is in a second predetermined state (in flight). Said state can correspond for example to the cruising altitude of the aircraft, for which it is preferable to have the best possible aerodynamic performance. The concavity is thus formed progressively when the aircraft leaves the cruising altitude for the descent. Conversely, the concavity present in the first state is progressively eradicated when the aircraft leaves this state to enter a second state in which a pressure difference is established between the inside and the outside of the aircraft and therefore between the inner and outer surfaces of the outer pane. The inner surface of the outer pane moves progressively away from the outer surface of the inner pane until it adopts the position in which the concavity is totally eradicated at the cruising altitude of the aircraft (second predetermined state).

FIG. 5 shows the window of the embodiment in FIG. 4 in the second predetermined state of the aircraft (flight at cruising altitude).

In said predetermined state, the shape of the outer pane 20 has been designed so that the outer surface of the pane adopts the optimum aerodynamic profile 25 shown in broken lines and situated in the extension of the curved profile of the fuselage. In said state, the window does not introduce any negative effect in terms of drag, constituting an improvement with respect to the state of the art (see FIG. 2) in which the outer pane forms a projection A that generates aerodynamic drag.

When the aircraft lands, the concavity progressively re-forms and the window returns to the conditions of the first state in which the concavity 22 in FIG. 4 reappears completely in the absence of an internal-external pressure difference of the aircraft.

In other embodiments, several concavities can be formed on a single outer pane in the first state. These concavities, configured with the same orientation on the outer surface of the pane are progressively eradicated when the aircraft leaves the first state.

It will be noted that in the case of a breakage in flight of the outer pane 20 in FIG. 5, the inner pane 21 can adopt exactly the shape or the position of the pane $3_2$ shown in FIG. 3 for the window of the state of the art. In fact, the inner pane of the window according to the invention is identical to that of the window of the state of the art.

The invention thus makes it possible:
 to reduce the quantity of material used to produce the window and therefore the on-board mass of the aircraft; in fact the thickness of the outer pane 20 is reduced to a value $e_e$ which can again be close to, or even identical to, the thickness $e_i$ of the inner pane 21 (a 30% reduction in the thickness of the outer pane can for example be envisaged with a cast transparent material such as cast acrylic);
 to give the outer pane and therefore the window an optimum aerodynamic shape during a flight of the aircraft at high altitude; and
 to retain good visibility through the window when on the ground (first state), owing to the reduction in thickness of the outer pane and by a suitable arrangement of the concavity imposed on the outer pane (concavity centred with respect to the pane).

FIG. 6 shows the flow chart of a method for manufacturing a window according to the invention.

It is noted that the first steps E1 and E2 of the method described are sufficient to manufacture the window of the invention and that the subsequent steps can be carried out optionally.

The method of manufacturing an aircraft window with planned deformation according to the invention comprises a first step E1 of determining a material suitable for forming the outer pane of the window. In a particular embodiment, a transparent material such as cast acrylic or polycarbonate is chosen for example.

In a second step E2, the method of manufacturing consists of calculating a first characteristic shape of the outer pane in the first aforementioned state (on-ground state of the aircraft).

This first shape of the pane characteristic of the first state is such that, when the physical conditions of the second predetermined state (for example a predetermined pressure difference between the inside and the outside of the aircraft) are applied thereto, for example when the aircraft is at a cruising altitude for example of 37,000 feet, it converts to a second shape. Said second shape of the outer pane is determined by the optimum shape dictated by the aerodynamic considerations of the flight at cruising altitude.

In order to arrive at a calculation of a characteristic shape of the first state, it is therefore necessary to invert the characteristic shape of the predetermined second state on the basis of the constraints resulting from the physical conditions linked with the first state (in particular absence of pressure difference between the inside and the outside of the aircraft).

The physical conditions linked to the aforementioned first and second states principally include the pressure difference applied to the inner and outer surfaces of the outer pane and, if applicable, the temperature.

On the basis of the two first steps, it is then possible to determine the quantity of material and the thickness of the outer pane, as well as its shape.

The first shape given to the outer pane for the first state thus makes it possible to reduce the thickness of this pane with respect to the state of the art. In fact, in the state of the art the thickness of the outer pane was necessarily greater in order to resist the pressure difference that is established during the flight of the aircraft, in particular at cruising altitude.

In order to optimize the step of calculating the shape of the pane characteristic of the first state, it is possible to supplement the calculation by implementing a step E3 during which a digital model of the window or at least the outer pane of the window is produced. The need to carry out tests on physical models is thus obviated.

Finite element modelling is performed of an initial characteristic shape for the outer pane. A model is generated (step E4) of the physical constraints linked to the first and second states, which are applied to the window in these states. Then (step E5), the shape of the outer pane in the first state is determined so that the shape of this pane in the second predetermined state meets the optimum aerodynamic conditions of the aircraft on which the window is mounted.

Once the characteristic shape of the outer pane in the first state has been designed (by calculation in particular), during the steps E1 and E2 and optionally E3 to E5, the method can comprise moreover, a step E6 of programming machines for the production of outer panes. This step is carried out on the basis of determining the characteristic shape of the outer pane in the first state.

Said programming makes it possible to form and machine the outer pane in a predetermined material.

In a particular embodiment, the production of an outer pane comprises a step E7 of producing the outer pane by moulding and/or by press forming of a material, for example an acrylic sheet.

It is thus possible to produce complex forms with one or more concavities.

In order to perform the moulding, forms or moulds programmed during the prior programming step are used.

Each shape or mould undergoes a polishing step E8 in order to give a predetermined optical characteristic to the outer pane thus formed in order to ensure good visibility through the pane.

Finally, the method of manufacturing an outer pane for a window with planned deformation according to the invention can also comprise a step E10 of cutting out and/or machining the outer pane in particular in order to fit it to the existing conventional holding frames on aircraft.

This cutting out and/or machining makes it possible to fit the outer pane to the window and also makes it possible to obtain a predetermined orientation of the edges of the sheet serving as the outer pane of the window with respect to the window frame.

As shown in FIG. 7, an aircraft window 50 comprises a pane 52 mounted in the holding frame 5 by means of a sealing system 54.

The frame 5, identical to the one shown in FIGS. 4 and 5, is used for securing the window to the fuselage 4 of the aircraft.

The other elements necessary for mounting the pane 52 on the frame are not shown here in the interests of clarity and inasmuch as they are well known to a person skilled in the art.

The pane 52 is shown in a first state of the aircraft (rest state).

The pane 52 has an inner surface 52a and an outer surface 52b in which a concavity 52c is arranged oriented toward the outside of the aircraft.

This concavity is less pronounced than in FIG. 4 but is nevertheless present.

All of the above description relating to FIGS. 4 and 5 with respect to the concavity and its progressive eradication as a pressure difference is established between the inside and the outside of the fuselage of the aircraft is also applicable in the present embodiment and therefore will not be repeated.

Unlike the embodiment in FIGS. 4 and 5, the one in FIG. 7 comprises only a single pane which is an assembly of several plies bonded together by an intermediate adhesive layer or film 56.

As shown in FIG. 7, the laminated assembly 52 comprises two plies 58 (outer ply) and 60 (inner ply) sandwiching the intermediate adhesive film 56.

For example, heating the thus-constituted assembly in an autoclave makes it possible to bond together the two plies 58 and 60.

In the embodiment described with reference to FIG. 7, the two plies are both made from one of the aforementioned transparent materials.

The intermediate film 56 is for example produced from PVB (polyvinyl butyral) or PU (polyurethane).

In a window of the prior art comprising an outer pane and a inner pane, an example of the total thickness of the window is 16.25 mm (11 mm for the outer pane and 5.25 mm for the inner pane).

The laminated assembly of the pane 52 makes it possible to reduce the total thickness of the window to 11 mm (5 mm for the outer ply, 4 mm for the inner ply and 2 mm for the intermediate film).

Such a reduction in thickness makes it possible to reduce the weight of a window and therefore the total on-board weight for all of the windows of an aircraft.

The sealing system or sealing ring 54 used for mounting the pane 52 on the frame 5 is for example produced from polysulphide mastic.

Said sealing material has the advantage of very limited deformation when subjected to stresses such as for example a pressure difference between the inner surface and the outer surface of the window pane.

Advantages associated with the use of said material are described with reference to FIGS. 8a, 8b, 9a and 9b.

The manufacture of the laminated assembly or sandwich 52 is particularly simple, as it can be carried out in a single moulding operation by previously placing the assembly of two plies separated by the adhesive film inside a mould of a suitable shape for the desired shape of the pane.

The polysulphide mastic is then injected into the mould at the periphery of the assembly so that the assembly constituted by the pane 52 and the sealing system 54 is obtained after opening the mould.

Figure 8A:
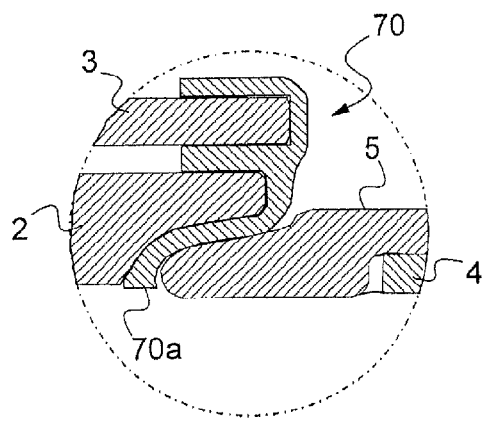
FIGS. 8a and 8b are enlarged partial diagrammatic cross-sectional views of a sealing system of a window of the prior art respectively when on the ground and in flight.

FIG. 8a is a partial diagrammatic enlarged view of a window of the prior art comprising the two panes 2 and 3 of the window in FIG. 1 and a sealing system 70 positioned at the periphery of the two panes for their mounting in the holding frame 5.

FIG. 8a shows the position of the sealing system or sealing ring 70 when the aircraft is on the ground.

As shown diagrammatically, the outer surface of the seal 70a is substantially flat.

Figure 8B:
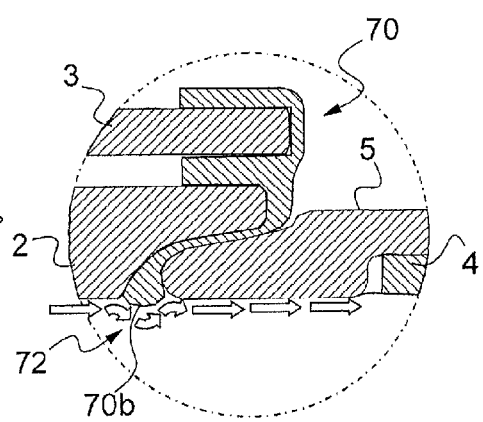

When the aircraft is in flight and a pressure difference is established between the inside and the outside of the aircraft, the seal 70 deforms as shown in FIG. 8b and the outer surface 70a deforms by outwardly forming a dome shape and adopts the appearance of the protuberance 70b in FIG. 8b.

This deformation takes place for example during pressurization of the aircraft cabin.

It is noted that the portion of the seal arranged between the rim of the outer pane 2 and the inner periphery of the frame 5 is pinched between the latter under the effect of the pressure difference.

The development of the domed shape 70b means that the outer surface of the seal is no longer flush with the outer surface of the outer pane 2 and the outer surface of the holding frame 5.

Thus, this unevenness leads to a separation of the air stream 72 following the outer surface of the aircraft at the protuberance 70b, thus creating an unwanted drag effect.

Figure 9A:
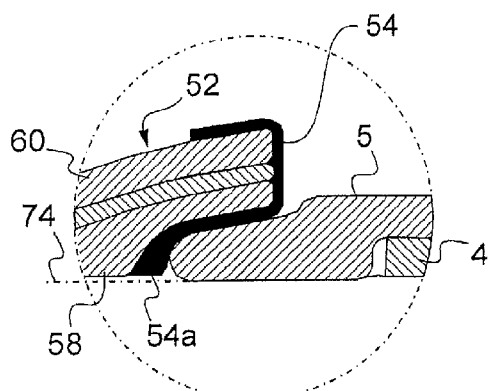
FIGS. 9a and 9b are views corresponding to those in FIGS. 8a and 8b of the sealing system of the window in FIG. 7.
Figure 9B:
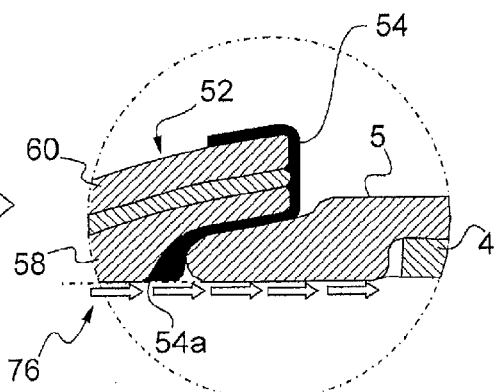

FIGS. 9a and 9b show respectively the behaviour of the sealing system 54 in FIG. 7 when the aircraft is on the ground and in flight (subjected to the same pressure difference as that shown in FIG. 8b).

As shown in FIG. 9a, the outer surface 54a of the sealing system or ring 54 is flat when on the ground and also remains substantially flat in flight, even when the portion of the sealing system arranged between the rim of the outer ply 58 and the inner periphery of the frame 5 is pinched between them under the effect of the pressure difference.

Under the effect of the pressure difference, the concavity of the pane 52 is progressively eradicated and the assembly of the pane 52 and the sealing system 54 is displaced toward the outside of the aircraft, so as to meet the virtual line 74 representing the extension of the outer surface of the frame 5 and the fuselage 4 in line with the pane.

Thus, under the effect of a pressure difference, the laminated assembly 52 is designed so that its outer surface as well as the outer surface 54a of the sealing system is arranged flush with the outer surface of the frame and the fuselage.

The air stream 76 following the outer surface of the aircraft is therefore undisturbed when passing over the sealing ring, thus avoiding the creation of an unwanted drag effect.

The avoidance of said effect is comparable to a reduction in the on-board mass of the aircraft in terms of fuel economy.

The invention claimed is:

1. An aircraft window, of a type comprising a holding frame for securing the window to the fuselage of an aircraft and at least one pane mounted in the holding frame by a sealing system, said at least one pane having an inner surface and outer surface, wherein:
   the pane comprises, in a first state called the rest state, at least one concavity in its outer surface when there is no pressure difference between the outer surface and the inner surface of the pane, and
   said at least one concavity of the pane is at least partially eradicated in a second state in which there is a pressure difference between the outer surface and the inner surface of the pane.

2. The aircraft window according to claim 1, wherein when the pressure difference between the outer surface and the inner surface of the pane reaches a predetermined value, said at least one concavity is completely eradicated.

3. The aircraft window according to claim 1, wherein in flight the outer surface of the pane comprising said at least one concavity has an optimum aerodynamic shape established for a given aircraft.

4. The aircraft window according to claim 1, wherein said at least one concavity is opposite to the concavity of the fuselage of the aircraft.

5. The aircraft window according to claim 1, wherein said at least one concavity is defined in a transverse cross-section of the fuselage.

6. The aircraft window according to claim 1, wherein the pane comprising said at least one concavity comprises at least one edge having a shape that makes it possible to insert said pane into a standard holding frame.

7. The aircraft window according to claim 1, comprising at least two panes, namely an inner pane and an outer pane comprising said at least one concavity, each pane having an inner surface and an outer surface, the inner surface of the outer pane facing the outer surface of the inner pane.

8. The aircraft window according to claim 1, wherein in the first state said at least one concavity tends to move the outer surface of the pane comprising said at least one concavity closer to the inside of the aircraft when there is no pressure difference between the outer surface and the inner surface of said pane, the at least partial eradication of said at least one concavity of said pane taking place in the second state, in which there is a pressure difference between the outer surface and the inner surface of said pane.

9. The aircraft window according to claim 1, wherein the pane comprising said at least one concavity is an assembly of several plies secured together by at least one intermediate film arranged between two consecutive plies.

10. The aircraft window according to claim 9, wherein the assembly comprises two plies and an intermediate film between the two superimposed plies.

11. The aircraft window according to claim 1, wherein the sealing system for mounting said at least one pane in the holding frame is made of polysulphide mastic.

12. An aircraft comprising a fuselage and at least one aircraft window according to claim 1, the window being secured to the fuselage.

13. A method for manufacturing an aircraft window comprising at least one pane having an inner surface and an outer surface, the method comprising forming a pane in order to give an outer surface thereof at least one concavity having a given depth, said at least one concavity being intended to be maintained in the outer surface at said depth in absence of a pressure difference between the inner and outer surfaces of the pane, and
   wherein forming the pane is adapted so that said at least one concavity given to the outer surface of the pane is at least partially eradicated as and when a pressure difference is established between the inner and outer surfaces of said pane.

14. The method according to claim 13, wherein the pane comprising said at least one concavity is designed so that, when a predetermined pressure difference operates between its inner and outer surfaces, the outer surface adopts an optimum aerodynamic shape for a given aircraft.

15. The method according to claim 13, wherein the window comprises at least two panes, namely an inner pane and an outer pane, and the forming step is applied to the outer pane.

16. The method according to claim 13, comprising a prior step of assembling several plies and at least one intermediate film arranged between two consecutive plies for securing the set of plies assembled in this way.

17. The method according to claim 13, comprising a step of injecting a material constituting a sealing system around said at least one pane for mounting the pane in a holding frame of the window.

18. The method according to claim 17, wherein the injected material constituting the sealing system is a polysulphide mastic.

* * * * *